(12) United States Patent
Gravel (10) Patent No.: US 10,011,427 B1
(45) Date of Patent: Jul. 3, 2018

(54) APPARATUS FOR SAWING OF A PLANK (71) Applicant: 9304-7645 QUEBEC INC., Sainte-Anne-de-Beaupre (CA)

(72) Inventor: Claude Gravel, St-Ferreol les Neiges (CA)

(73) Assignee: 9304-7645 QUEBEC INC., Saint-Anne-de-Beaupre, Quebec (CA)

( * ) Notice: Subject to any disclaimer, the term of this patent is extended or adjusted under 35 U.S.C. 154(b) by 0 days.

(21) Appl. No.: 15/484,902

(22) Filed: Apr. 11, 2017

(51) Int. Cl.
| | |
|---|---|
| B65G 15/06 | (2006.01) |
| B65G 15/12 | (2006.01) |
| B65G 15/14 | (2006.01) |
| B65G 23/22 | (2006.01) |
| B27B 31/00 | (2006.01) |

(52) U.S. Cl.
CPC ............ B65G 15/14 (2013.01); B27B 31/006 (2013.01); *B65G 2201/0282* (2013.01)

(58) Field of Classification Search
CPC ........ B65G 15/06; B65G 15/12; B65G 15/14; B65G 23/22; B27B 31/006
USPC ............ 198/604, 605, 608; 144/248.5, 253.7
See application file for complete search history.

(56) References Cited

U.S. PATENT DOCUMENTS

| | | | | | |
|---|---|---|---|---|---|
| 2,169,394 | A | * | 8/1939 | Richardson | B27B 25/02 144/246.1 |
| 3,045,728 | A | * | 7/1962 | Hutchinson | B27L 1/045 144/208.8 |
| 3,844,399 | A | * | 10/1974 | Sellers, Jr. | B27B 25/02 144/242.1 |
| 4,144,782 | A | * | 3/1979 | Lindstrom | B27B 1/007 83/102.1 |
| 4,210,184 | A | * | 7/1980 | McGriff | B23D 47/005 125/13.01 |
| 4,637,443 | A | * | 1/1987 | Jansson | B27B 15/08 144/248.5 |
| 4,947,909 | A | * | 8/1990 | Stroud | B27B 1/007 144/3.1 |
| 5,421,386 | A | * | 6/1995 | Lundstrom | B27B 1/007 144/3.1 |
| 5,435,361 | A | * | 7/1995 | Knerr | B27B 1/007 144/248.5 |
| 5,447,186 | A | * | 9/1995 | Achard | B27B 1/007 144/116 |
| 5,853,038 | A | * | 12/1998 | Newnes | B27B 1/007 144/245.2 |

(Continued)

*Primary Examiner* — Douglas A Hess
(74) *Attorney, Agent, or Firm* — Eversheds Sutherland (US) LLP (57) ABSTRACT

An apparatus for guiding a plank along a transfer path and towards a cutting assembly. The apparatus includes an auto-centering lateral displacement mechanism maintaining support plates and corresponding guide and drive elements equidistant relative to the transfer path and includes: at least one pair of fixed length vertically extending driving shafts connected to each one of the support plates, the driving shafts each having a lower end connected to the corresponding support plate and being angularly movable relative to a vertical axis according to the lateral position of the corresponding support plate; at least one bushing assembly mounted to the upper section of the frame and receiving therein the upper end of a corresponding one of the driving shafts; and a fixed length connecting shaft extending between the driving shafts of the at least one pair of driving shafts, at the upper end thereof.

16 Claims, 10 Drawing Sheets

(56) References Cited

U.S. PATENT DOCUMENTS

| | | | | |
|---|---|---|---|---|
| 6,216,756 B1* | 4/2001 | Mason | ................ | B27B 31/003 |
| | | | | 144/246.2 |
| 6,296,029 B1* | 10/2001 | Grivna | ................ | B27C 1/12 |
| | | | | 144/115 |
| 6,896,019 B2* | 5/2005 | Achard | ................ | B23Q 1/621 |
| | | | | 144/245.1 |
| 7,117,907 B2* | 10/2006 | Mitchell | ................ | B27G 13/007 |
| | | | | 144/39 |
| 7,536,932 B1* | 5/2009 | Brown | ................ | F16C 15/00 |
| | | | | 310/74 |
| 9,849,491 B2* | 12/2017 | Della Rossa | ................ | B21C 1/30 |

* cited by examiner

APPARATUS FOR SAWING OF A PLANK

FIELD OF THE INVENTION

The present invention relates to the field of timber sawing. More particularly, it relates to an apparatus for sawing of a plank following the natural curvature of the plank.

BACKGROUND

It is known in the timber industry, to use sawing systems with lateral guiding elements for guiding successive planks towards cutting tools used for sawing each one of the planks into smaller planks or boards.

For example and without being limitative, U.S. Pat. No. 7,536,939 issued May 26, 2009, teaches an apparatus and a method for guiding and driving a plank along a transfer path to assist in curve sawing of the plank, based on at least one parameter thereof. In order to perform such guiding and driving of the planks along the transfer path and towards cutting tools, the apparatus includes evaluation means evaluating the plank and generating a signal indicative of at least one parameter of the plank; a platform with at least one support plate displaceable transversally with regards to the transfer path of the plank, in response to the signal by the evaluation means; first and second guides, each comprising guide and drive elements mounted on the platform and arranged in opposed configuration laterally relative to the transfer path of the plank, the guide and drive elements of the first guide being displaceable at an angle with respect to the transfer path and the guide and drive elements of the second guide being substantially parallel to the transfer path and displaceable transversally with regards to the transfer path; and displacing means for displacing the guide and drive elements of the first and second guides. The evaluation means, support plates, first and second guides, and displacing means cooperating with one another to guide and drive the plank along the transfer path and towards the cutting tools, in response to the signal from the evaluating means.

However, known systems tend to suffer from several drawbacks. For example, known apparatuses for guiding and driving a plank along a transfer path to assist in curve sawing of the plank commonly use a mechanical connector (e.g. a mechanical connection including a hydraulic actuator, a temposonic actuator or the like) directly connecting the support plates onto which the first and second guides positioned on each side of the transfer path are mounted, for performing auto-centering of the support plates and the corresponding first and second guides. In operation, the mechanical connector directly connecting the support plates can lead to an auto-centering mechanism not having the desired precision. Moreover, the mechanical connector directly connecting the support plates is generally required to be locked to a desired length defining the spacing between the support plate, before engagement of the first and second guides with a plank, and remain in the locked length for the time period of the first and second guides with a plank, in order to prevent auto-centering problems.

In view of the above, there is a need for an improved apparatus for curve sawing of a plank which, by virtue of its design and components, would be able to overcome or at least minimize some of the above-discussed prior art concerns.

SUMMARY OF THE INVENTION

In accordance with a first general aspect, there is provided an apparatus for guiding a plank along a transfer path having a central axis and towards a cutting assembly. The apparatus comprises: a frame having a platform with a support surface for supporting the plank and an upper section at an upper end of the frame, the platform comprising two support plates displaceable transversally with respect to the transfer path and equidistant relative to the central axis; at least one support plate actuator operatively connected to a corresponding one of the support plate, the support plate actuator displacing the corresponding one of the support plate transversally with respect to the transfer path; a lateral guiding system including guide and drive elements positioned on each sides of the transfer path for receiving, guiding and driving the plank along the transfer path, the guide and drive elements being movable transversally with respect to the transfer path and being equidistant relative to the central axis, with the guide and drive elements positioned on a same side of the transfer path each being operatively connected to a corresponding one of the support plate; and an auto-centering lateral displacement mechanism maintaining the support plates and the corresponding guide and drive elements equidistant relative to the transfer path, the auto-centering lateral displacement mechanism including a support plate connecting assembly. The support plate connecting assembly comprises: at least one pair of fixed length vertically extending driving shafts having one driving shaft connected to each one of the support plates, the driving shafts each having a lower end connected to the corresponding support plate and an upper end and being angularly movable relative to a vertical axis according to the lateral position of the corresponding support plate; at least one bushing assembly mounted to the upper section of the frame, each bushing assembly receiving therein the upper end of a corresponding one of the driving shafts of the at least one pair of driving shafts; and a fixed length connecting shaft extending between the driving shafts of the at least one pair of driving shafts, at the upper end thereof.

In an embodiment, the at least one pair of fixed length vertically extending driving shafts includes at least two pairs of fixed length vertically extending driving shafts.

In an embodiment, the auto-centering lateral displacement mechanism further comprises two sets of jointed arms. Each set of jointed arm is located on one side of the transfer path and each arm of each set of jointed arms has a distal end pivotally mounted to a corresponding one of the support plates and a proximal end pivotally mounted to the corresponding guide and drive elements. The arms of each set of jointed arms move substantially parallel to one another and the pivotal movement of the two sets of jointed arms are synchronized by the support plate connecting assembly.

In an embodiment, each one of the driving shafts of the support plate connecting assembly is rotatable and is connected to one of the jointed arm of the two sets of jointed arms, at the distal end thereof, and rotating therewith. The support plate connecting assembly further comprises extension members connected at the upper ends of each one of the driving shafts. The extension members have a proximal end and a distal end spaced apart from a rotating center of the corresponding driving shaft. The connecting shaft is mounted to the distal ends of the extension members of the corresponding driving shafts.

In an embodiment, the distal end of each one of the jointed arm of the two sets of jointed arms is mounted to a rotating anchor rotatingly connected to the corresponding support plate. Each one of the driving shafts of the support plate connecting assembly is connected to a corresponding rotating anchor.

In an embodiment, the apparatus further comprises at least one lateral guiding system actuator operatively connected between a corresponding one of the support plates and the corresponding guide and drive elements for laterally moving the corresponding guide and drive elements relative to the transfer path.

In an embodiment, each arm of the two sets of jointed arms comprises an actuation extension extending from the distal end thereof and the at least one of the lateral guiding system actuator includes an actuator actuating the actuation extension of the arm of the two sets of jointed arms.

In an embodiment, the lateral guiding system actuator is a bellows actuator.

In an embodiment, the lateral guiding system includes a first guide and drive mechanism and a second guide and drive mechanism. The first guide and drive mechanism includes two first guide and drive elements arranged opposite relative to the transfer path and the second guide and drive mechanism includes two second guide and drive elements arranged opposite relative to the transfer path and being substantially parallel to the transfer path. The guide and drive elements of the first guide and drive mechanism and the second guide and drive mechanism positioned on a same side of the transfer path are connected through a pivoting axis.

In an embodiment, the proximal end of each arm of each set of jointed arms is pivotally mounted to the corresponding second guide and drive elements of the second guide and drive mechanism.

In an embodiment, the two first guide and drive elements are pivotable relative to the transfer path. The apparatus further comprises a first guide and drive elements pivoting assembly comprising vertically extending rotation inducing shafts each having a lower end connected to a corresponding one of the first guide and drive elements and an upper end. The rotation inducing shaft is rotatable to pivot the corresponding first guide and drive element.

In an embodiment, the first guide and drive elements pivoting assembly further comprises connecting arms. Each one of the connecting arms has a proximal end connected to the lower end of a corresponding one of the rotation inducing shafts and a distal end mounted to the corresponding one of the first guide and drive elements.

In an embodiment, each rotation inducing shaft is connected to a rotation inducing actuator at an upper end thereof, the rotation inducing actuator being mounted on the upper section of the frame.

In an embodiment, the rotation inducing actuator is a bellows actuator longitudinally displacing the upper end of the rotation inducing shaft.

In an embodiment, each of the guide and drive elements of the first and second guide and drive mechanisms include endless chains having a toothed exterior surface, and toothed wheels for driving the chains.

In an embodiment, the apparatus further comprises a vertically extending driving shaft operatively connected between one of the toothed wheels and a motor mounted to the upper section of the frame.

DETAILED DESCRIPTION

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the curve sawing apparatus and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the curve sawing apparatus, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Referring generally to FIGS. 1 to 4, there is shown a sawing apparatus 9 according to an embodiment. In the embodiment shown, the apparatus 9 includes a frame 8 having a base 7 engaging a support surface onto which the frame 8 is supported and a platform 42 with a support surface 44 for supporting successive planks (not shown)

brought into the apparatus 9 and towards a wood cutting assembly 22. For example and without being limitative, the wood cutting assembly 22 can include a set of chipping heads (not shown) to square off or trim the planks before it reaches cutting tools (not shown), such as saws or the like. The frame 8 also includes an upper section 45 extending above the platform 42, at an upper end of the frame 8.

The embodiment shown, the curve sawing apparatus 9 includes a lateral guiding system 21 engaging each plank laterally and guiding the plank towards a cutting assembly, where the plank can for example be sawn into boards (not shown), in accordance with a predetermined cutting pattern. A curve sawing apparatus including a lateral guiding system 21 according to an embodiment is described in the above discussed U.S. Pat. No. 7,536,939 issued May 26, 2009, the entire contents of which being incorporated herein by reference.

Figure 10:
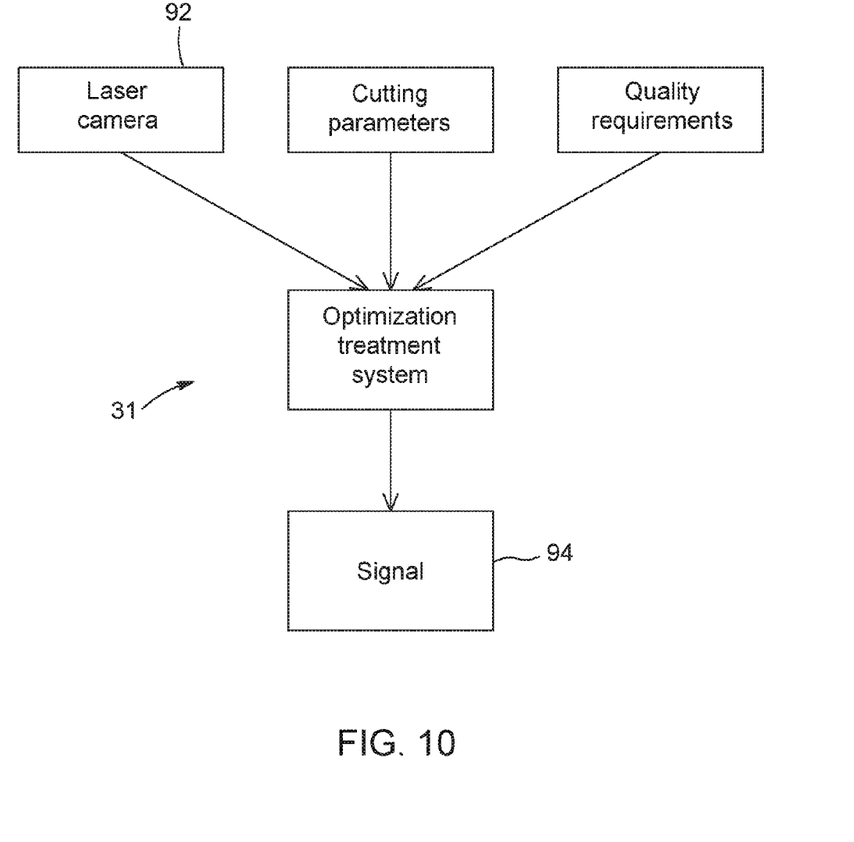
FIG. 10 is a block diagram showing components of an evaluation system for evaluating a plank and generating a signal representative of at least one parameter of the plank.

Referring to FIG. 10, in an embodiment, the apparatus 9 also includes an evaluation system 31 evaluating the plank and generating a signal 94 representing at least one parameter of a plank such as, for example and without being limitative the taper, thickness, length and/or curvature of the plank.

In an embodiment, the evaluation system 31 includes optimization software determining the choice of chipping pattern, following an analysis of the form of each plank. In an embodiment, the optimization software determines the chipping pattern by way of laser cameras 92 taking readings of the corresponding plank in order to reproduce the three-dimensional geometric form of the plank. Once the profile of the plank is defined, the optimization software generates the optimal sawing solution as a function of at least one representative parameter for which the signal 94 is generated. For example, and without being limitative, optimisation software of companies Autolog® and Optisim Consultants®, or other equivalent optimisation software, can be used.

Referring to FIGS. 1 to 9, in the embodiment shown, the lateral guiding system 21 of the apparatus 9 includes a first guide and drive mechanism 11 mounted to the platform 42 of the frame 8 for receiving, guiding and driving each plank along a transfer path 20 on the support surface 44, the transfer path having a central axis X defining a central axis of the apparatus 9. In an embodiment, the first guide and drive mechanism 11 comprises two first guide and drive elements 10, 12 located opposite relative to the transfer path 20 of the planks, on lateral sides thereof and equidistant relative to the transfer path 20 and the central axis X thereof. The two first guide and drive elements 10, 12 are movable transversally with respect to the transfer path (i.e. they are movable along the transversal axis Y, extending substantially perpendicular to the central axis X of the transfer path 20).

In the embodiment shown, the apparatus 9 also includes a second guide and drive mechanism 15 mounted on the platform 42 of the frame 8 for guiding and driving each plank from the first guide and drive mechanism 11, along the transfer path 20, on the support surface 44, and up to the cutting assembly 22. In an embodiment, the second mechanism 15 has two second guide and drive elements 14, 16 located opposite relative to the transfer path 20 of the planks and being substantially parallel and equidistant relative to the transfer path 20 and the central axis X thereof. The two second guide and drive elements 14, 16 are movable transversally with respect to the transfer path (i.e. they are movable along the transversal axis Y, extending substantially perpendicular to the central axis X of the transfer path 20).

The guide and drive elements 10, 12, 14 and 16 of each one of the first and second guide and drive mechanisms 11, 15 located on the same side of the transfer path 20, such as guide and drive elements 10, 14 and guide and drive elements 12, 16, are connected to a common pivoting axis 46.

In an embodiment, the platform 42 of the frame 8 further includes two support plates 4, 6 onto which the components of the first and second guide and drive mechanisms 11, 15 are mounted. For example and without being limitative, in an embodiment, the two support plates 4, 6 are laterally movable mobile steel plates. The two support plates 4, 6 are equidistant in relation to the transfer path 20. The guide and drive elements 10, 12, 14 and 16 of the first and second mechanisms 11, 15 which are located on the same side of the transfer path 20 are operatively connected to the same corresponding support plate 4, 6. For example, in the embodiment shown, guide and drive elements 10, 14 are operatively connected to a first support plate 4 and the guide and drive elements 12, 16 are operatively connected to the second support plate 6.

The apparatus 9 also comprises two plate actuators 54 for displacing the support plates 4, 6 transversally in relation to the transfer path 20 (i.e. along the transversal axis Y, extending substantially perpendicular to the central axis X of the transfer path 20), in response to the control signal 94. Each plate actuator 54 is transversally mounted with respect to the transfer path 20 and comprises a first end fixed to the platform 42 of the frame 8 and a second end fixed to the corresponding support plate 4, 6. For example and without being limitative, in an embodiment, the plate actuators 54 are hydraulic cylinders with Temposonic® position sensor. One skilled in the art will however understand that in alternative embodiments, other linear actuators, such as an hydraulic cylinder with Linear Variable Differential Transformer and proportional valve, an electric cylinder with a servo motor, or the like can be used.

The apparatus 9 also includes an auto-centering lateral displacement mechanism 55 for displacing the guide and drive elements 10, 12, 14 and 16 of the first and second guide and drive mechanisms 11, 15 with regards to the transfer path 20, in response to the signal by the evaluation system 31. In an embodiment, the auto-centering lateral displacement mechanism 55 includes first and second sets of jointed arms 56 located on either side of the transfer path 20, each set of jointed arms 56 being pivotally mounted between the corresponding support plates 4, 6 and second guide and drive elements 14, 16 and being operatively connected to the set of jointed arms 56 by a support plate connecting assembly 79, the pivotal movement of the two sets of jointed arms 56 being synchronized by the support plate connecting assembly 79.

Each arm 56 of each set of jointed arms 56 is oriented in parallel to the corresponding arm of the set of jointed arms 56. Each arm 56 of each set of jointed arms 56 has a distal end 56a pivotally connected to the corresponding support plate 4, 6 and a proximal end 56b pivotally connected to the corresponding one of the second guide and drive elements 14, 16. In the embodiment shown, the distal end 56a is mounted to a rotating anchor 68 rotatingly connected to the corresponding one of the support plates 4, 6. In an embodiment, the rotating anchor 68 is a rotating shaft extending substantially vertically from the corresponding one of the support plates 4, 6 and rotatable thereabout (see FIG. 9). One skilled in the art will understand that, in an alternative embodiment (not shown), each arm 56 of each set of jointed arms 56 could be rotatably mounted to a fixed (i.e. non-rotative) anchor at the distal end 56a.

In the embodiment shown, each arm 56 further includes an actuation extension 56c extending from the distal end 56a and opposed to the proximal end 56b. The actuation extension 56c is connected to a lateral guiding system actuator 75, to actuate the jointed arms 56 (i.e. to drive and induce pivoting of the jointed arms 56), thereby driving the second guide and drive elements 14, 16 towards or away from the path 20, while being maintained substantially parallel therewith. In the embodiment shown, the actuation extensions 56c are angled relative to the corresponding arm 56, defined between the distal end 56a and the proximal end 56b, but one skilled in the art will understand that, in an alternative embodiment (not shown), the actuation extensions 56c could be substantially aligned with the corresponding arm 56.

In the embodiment shown, the actuator 75 is a bellows actuator using bellows 76 positioned on each side of the actuation extensions 56c. However, one skilled in the art will understand that, in an alternative embodiment (not shown), other actuator, such as, without being limitative, a linear actuator (e.g. an hydraulic cylinders with Temposonic® position sensor, an hydraulic cylinder with Linear Variable Differential Transformer and proportional valve, an electric cylinder with a servo motor, or the like) connected between the corresponding support plate 4, 6 and the actuation extensions 56c of the corresponding arm 56 can be used. One skilled in the art will also understand that, in an alternative embodiment (not shown), each arm 56 of each set of jointed arms 56 can be free of actuation extension 56c, the actuator 75 thereby being connected between the corresponding support plate 4, 6 and second guide and drive elements 14, 16.

The support plate connecting assembly 79 of the auto-centering lateral displacement mechanism 55 further includes at least one pair of fixed length vertically extending driving shafts 80, each being operatively connected to the distal end 56a of a corresponding one of the arms 56 at a lower end 80a thereof and rotating therewith. In the embodiment shown, two pairs of fixed length vertically extending driving shafts 80 are provided. In the embodiment shown, the vertically extending driving shafts 80 are each connected to a corresponding one of the rotating anchors 68 at a lower end 80a thereof, to rotate along with the corresponding rotating anchor 68 (and consequently the distal end 56a of the corresponding arm 56), while allowing angular movement therebetween (see FIG. 9). In an embodiment, the connecting assembly for connecting the vertically extending driving shafts 80 and the corresponding rotating anchor 68 includes an articulated joint to allow such angular movement therebetween. One skilled in the art will understand that, in an alternative embodiment (not shown), where the arms 56 are pivotally connected to a non-rotative anchor, the vertically extending driving shafts 80 could rotate along with the rotation of the distal end 56a of the corresponding arm 56, rather than along with the rotative anchor 68.

The support plate connecting assembly 79 of the auto-centering lateral displacement mechanism 55 further includes a driving shaft connecting mechanism 81 connecting the upper ends 80b of the driving shafts 80 connected to one of the support plate 4 to the upper ends of the driving shafts 80 connected to the other one of the support plate 6 and synchronizing the rotational movement as well as the vertical translation therebetween.

Figure 1:
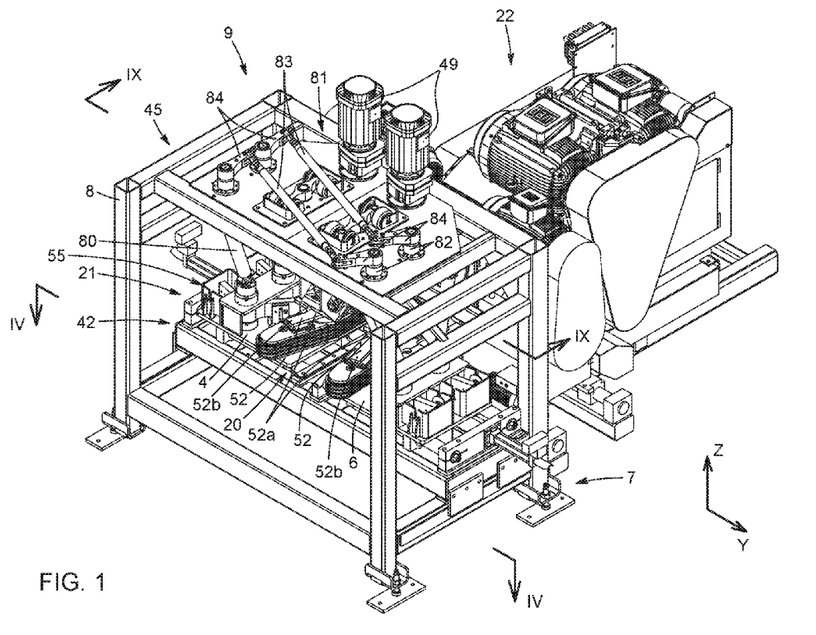
FIG. 1 is a perspective view of the apparatus in accordance with an embodiment.
Figure 2:
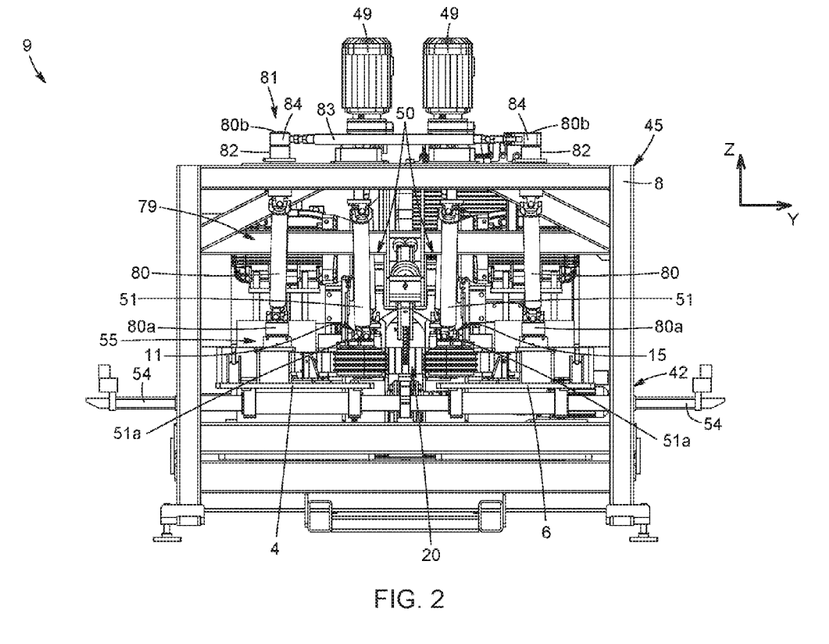
FIG. 2 is a front elevation view of the apparatus of FIG. 1.
Figure 3:
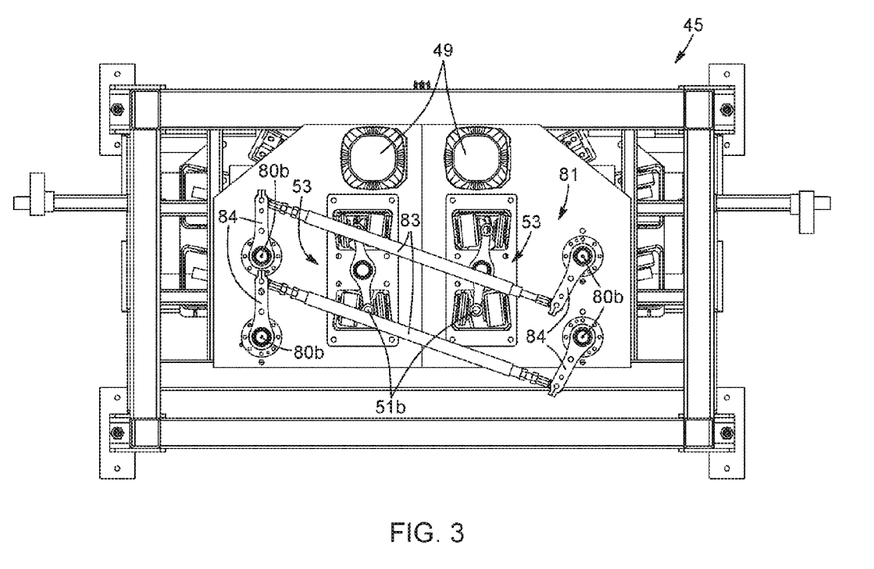
FIG. 3 is a top plan view of the apparatus of FIG. 1.
Figure 4:
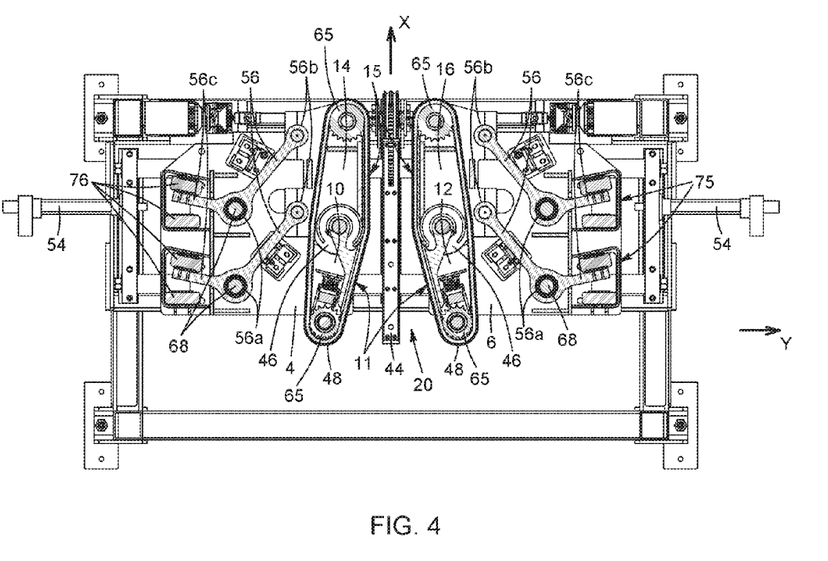
FIG. 4 is a cross section view of the apparatus of FIG. 1, without the cutting assembly and taken along lines IV-IV in FIG. 1.
Figure 5:
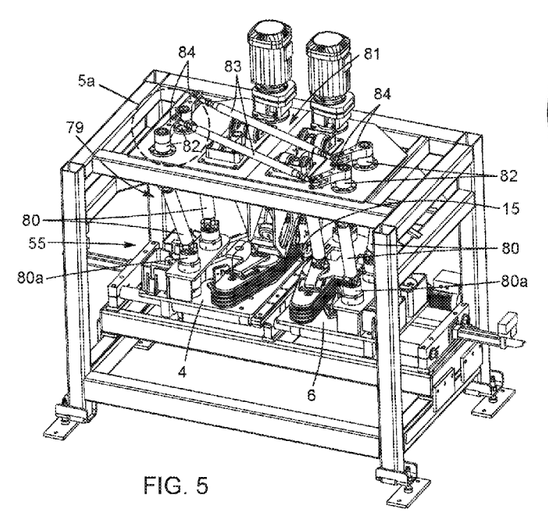
FIG. 5 is a perspective view of the apparatus of FIG. 1, without the cutting assembly, and showing the apparatus in a configuration where support plates are positioned proximate to a central axis of the apparatus.
Figure 5A:
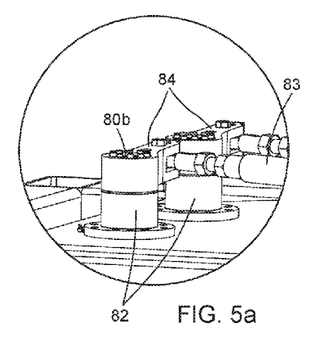
FIG. 5a is an enlarged view of a portion of the apparatus of FIG. 4, showing the bushing assemblies of a driving shaft connecting mechanism of the apparatus and the corresponding upper ends of driving shafts extending therein.
Figure 6:
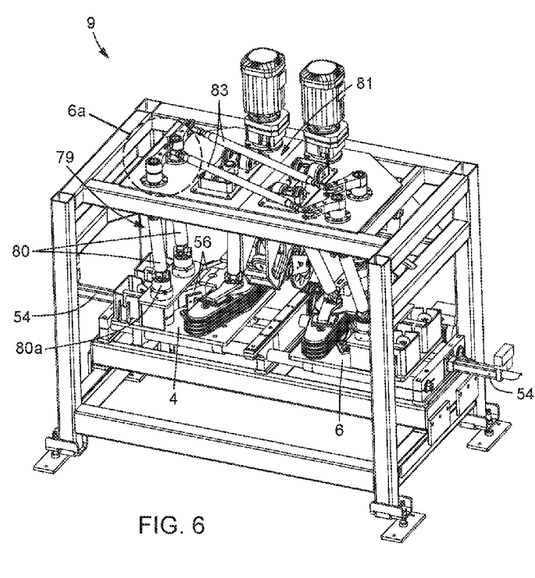
FIG. 6 is a perspective view of the apparatus of FIG. 1, without the cutting assembly, and showing the apparatus in a configuration where the support plates are positioned further away from the central axis of the apparatus than in FIG. 4.
Figure 6A:
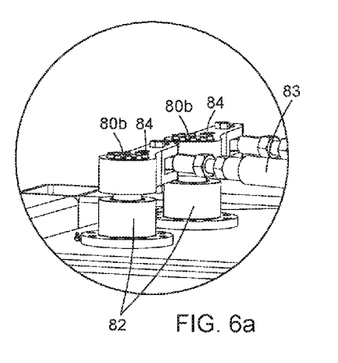
FIG. 6a is an enlarged view of a portion of the apparatus of FIG. 5, showing the bushing assemblies of the driving shaft connecting mechanism of the apparatus and the corresponding upper ends of driving shafts extending therein.

With reference to FIGS. 5 to 6a, in the embodiment shown, the driving shaft connecting mechanism 81 includes bushing assemblies 82 (or flange bearing assemblies) mounted to the upper section 45 of the frame 8. Each bushing assembly 82 is fixedly mounted to the upper section 45 of the frame 8 and receives therein an upper end 80b of a corresponding driving shafts 80. Each vertically extending driving shafts 80 includes a section angled relative to a vertical axis Z and being angularly movable (i.e. its angular position can vary according to the lateral position of the corresponding support plate 4, 6), when the corresponding support plate 4, 6 is moved laterally, such that the upper end 80b of the fixed length driving shaft 80 connected therewith moves upwardly or downwardly inside the corresponding bushing assembly 82. In an embodiment, the vertically extending driving shafts 80 also includes an articulated joint proximate to the upper end 80b, thereof, to allow the angular movement of the section of the fixed length vertically extending driving shaft 80.

The driving shaft connecting mechanism 81 further includes fixed length connecting shafts 83 extending between (or connecting) the upper ends 80b of each driving shaft 80 connected to one of the support plate 4 to the upper end of a corresponding driving shaft 80 connected to the other one of the support plate 6. In other words, the connecting shafts 83 are fixed length rods connecting the upper ends 80b corresponding ones of the driving shafts 80 connected to one of the support plate 4 and driving shafts 80 connected to the other one of the support plate 6. The connecting shafts 83 ensure that the vertical translation of the upper end 80b of one driving shaft 80 (i.e. the vertical movement of the upper end 80b of one driving shaft 80 in the corresponding bushing assembly 82) is transferred to the corresponding driving shaft 80 connected therewith.

Hence, the above described combination of the vertically extending driving shafts 80 connected to the support plates 4, 6 and connected by the driving shaft connecting mechanism 81, maintains the support plates 4, 6 equidistant in relation to the transfer path 20 and the central axis X thereof, when being laterally moved. In other words, the above described combination of the vertically extending driving shafts 80 connected to the support plates 4, 6 and connected by the driving shaft connecting mechanism 81 ensures that the support plates 4, 6 move in a mirror configuration. Therefore, when the support plates 4, 6 are displaced, the support plate connecting assembly 79 operates to maintain the centering of at least the second guide and drive elements 14, 16 operating as a guide mechanism for the curve cutting of the planks.

For example, FIGS. 5 and 5a show the support plates 4, 6 positioned proximate to the central axis X of the transfer path 20 and the upper ends 80b of the driving shafts 80 being vertically lower and FIGS. 6 and 6a show the support plates 4, 6 positioned further away from the central axis X of the transfer path 20 and the upper ends 80b of the driving shafts 80 being vertically higher than in FIGS. 5 and 5a, with the support plates remaining equidistant in relation to the central axis X of the transfer path 20.

Figure 7:
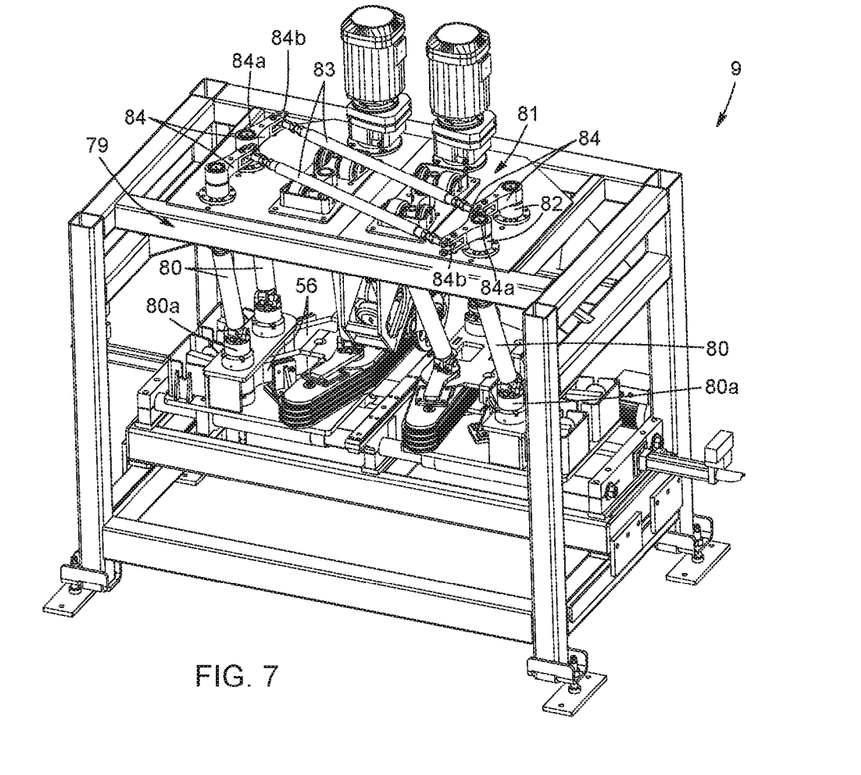
FIG. 7 is a perspective view of the apparatus of FIG. 1, without the cutting assembly, and showing the apparatus in a configuration where first and second guide and drive mechanisms are positioned proximate to the central axis of the apparatus.
Figure 8:
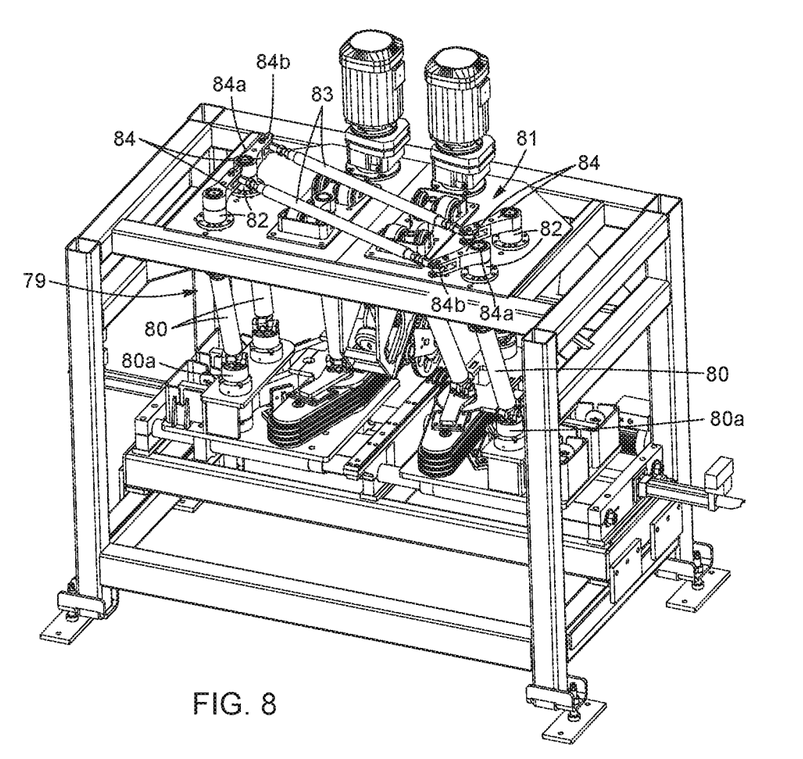
FIG. 8 is a perspective view of the apparatus of FIG. 1, without the cutting assembly, and showing the apparatus in a configuration where first and second guide and drive mechanisms are positioned further away from the central axis of the apparatus than in FIG. 6.
Figure 9:
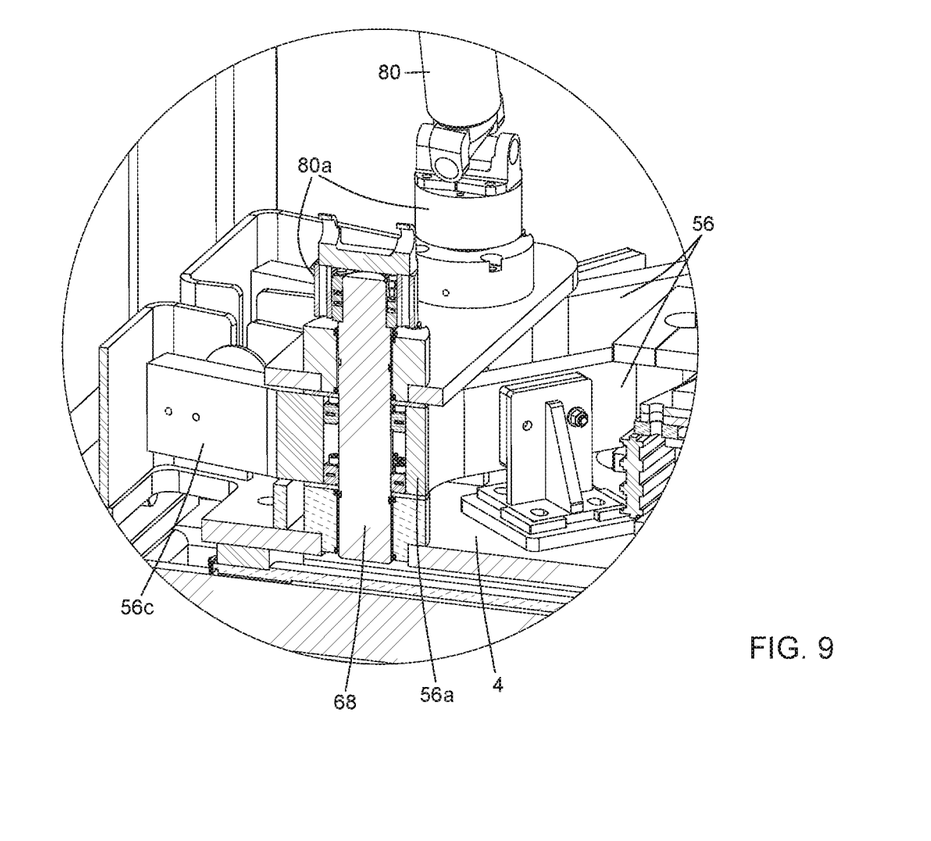
FIG. 9 is an enlarged cross-section view of a rotating anchor operatively connected to the distal end of one jointed arm and a vertically extending shaft of the support plate connecting assembly, taken along line IX-IX in FIG. 1.

Referring to FIGS. 7 and 8, in the embodiment shown, the driving shaft connecting mechanism 81 further includes extension members 84 extending substantially horizontally from the upper ends 80b of the driving shafts 80. Each extension member 84 has a proximal end 84a connected to the upper end 80b of the corresponding driving shaft 80, such that the extension member 84 rotates along with the corresponding driving shaft 80, and a distal end 84b spaced apart from the proximal end 84a and from a rotation center of the upper end 80b of the corresponding driving shaft 80. The connecting shafts 83 are connected to the distal ends 84b of the extension members 84 of the corresponding driving shafts 80 such that the rotation of one driving shaft 80 (i.e. the rotational movement of the upper end 80*b* of one driving shaft 80) is transferred to the corresponding driving shaft 80 connected therewith.

Hence, the above described combination of the vertically extending driving shafts 80 rotatingly connected to distal end 84*b* of the extension member 84, with the driving shafts 80 being operatively connected to the distal end 56*a* of a corresponding one of the arms 56, at a lower end 80*a* thereof, ensures synchronized movement of the first and second sets of jointed arms 56 located on either side of the transfer path 20 (and the corresponding second guide and drive elements 14, 16), thereby maintaining the second guide and drive elements 14, 16 equidistant in relation to the transfer path 20 and the central axis X thereof. For example, FIGS. 7 and 8 show the second guide and drive element 14, 16 being positioned in different position relative to the central axis X of the transfer path 20 with the driving shafts 80 and the corresponding extension members 84 and connecting shaft 83 in different angular configuration, each angular configuration corresponding to the associated position of the second guide and drive elements 14, 16.

Referring to FIGS. 1 to 9, as can be seen in the appended Figures, the set of jointed arms 56 each define a parallelogram, with distal 56*a* pivotal ends operatively connected to one another by the above-described support plate connecting assembly 79. The link provided by the above-described support plate connecting assembly 79, results in parallel and centered positioning of the plank in relation to the central axis X of the transfer path 20 and centered positioning of the plank in relation to pivoting points of the jointed arms 56 (i.e. the distal ends 56*a*) thereof. Such an assembly results in the plank being held tightly, irrespective of the defects on the surface of the plank, for example as it is conveyed through the apparatus 9. The parallelogram positioning of each set of jointed arms 56 and the pressure exerted on the sides of the planks by the guide and drive elements 10, 12, 14 and 16 of each one of the first and second guide and drive mechanisms 11, 15 can also be adjusted according to the signal representing the at least one parameter of the plank generated by the evaluation system 31, such as to control the position and stability of the plank in the cutting assembly 22.

The support plates 4, 6 are operative to perform the displacement of the components of the first and second guide and drive mechanisms 11, 15 with the objective of maximizing the positioning of each one of the planks. In other words, the lateral displacement of the support plates 4, 6 allows the adjustment of a central axis of a fine end of each plank, either toward the right or toward the left of a central axis of the components of the cutting assembly 22, such as, for example, chipping heads. Therefore, as the planks are moved into the cutting assembly 22, each one of the planks can be displaced gradually so that the central axis of a coarse end of the plank corresponds to the central axis X of the transfer path 20 or to the central axis of the components of the cutting assembly 22, such as, for example, chipping heads, to maximize the quality and the yield of cutting for each plank.

In view of the above, it will be understood that the position of the guide and drive elements 10, 12, 14, 16 varies for each plank and adapts as the plank moves along the transfer path 20. Moreover, displacement of the mobile support plates 4, 6 creates a shift in the central axis of the plank with respect to the central axis X of the transfer path 20, following the natural curvature of the plank. The above described system also results in independent pressure being exerted on the plank inside the two zones defined by the first and second guide and drive mechanisms 11, 15.

In view of the above, it will be understood that the first guide and drive mechanism 11 operates to perform the reception, guiding and driving of the plank across a first zone where the plank is guided to the entrance of the second guide and drive mechanism 15, for subsequent curve cutting thereof. It is in this first zone that the first guide and drive mechanism 11 adjusts to the trajectory of the plank to subsequently cause a reduction of the curvature of the plank in the cutting assembly 22, as the first guide and drive elements 10, 12, and the pivot axis 46 position the plank at the entrance of the second guide and drive mechanism 15, taking into account the form and dimensions of each plank. For example, the first guide and drive mechanism 11 can cause a reduction of the curvature of the plank in the cutting assembly 22 whose curvature is too pronounced by performing a transfer of pressure on the second guide and drive mechanism 15, which results in an opening of the second guide and drive mechanism 15 and consequent displacement of the central axis of the plank with regards to the central axis of the second guide mechanism 15 (i.e. the central axis X of the transfer path 20) and allows the modification of the natural curve trajectory of the plank. Therefore, the plank is no longer processed in the cutting assembly 22 (e.g. trimmed and cutted) following the natural curvature of the plank and the parameters for cut products, which are set by the manufacturer, can be achieved. The first guide and drive mechanism 11 also acts as a shock absorber for stabilizing the planks and reduces the vibrations caused by surface imperfections, such as knots on the sides of the planks.

In an embodiment, the first guide and drive elements 10, 12 of the first guide and drive mechanism 11 are pivotable relative to the transfer path to facilitate the reception and subsequent guiding and driving of the plank across the first zone where the plank is guided to the entrance of the second guide and drive mechanism 15. In the embodiment shown, in order to perform the pivoting of the first guide and drive elements 10, 12 of the first guide and drive mechanism 11, the apparatus includes a first guide and drive elements pivoting assembly 50. The first guide and drive elements pivoting assembly 50 comprises vertically extending rotation inducing shafts 51 each having a lower end 51*a* and an upper end 51*b* and connecting arms 52 each having a proximal end 52*a* and a distal end 52*b*. The lower ends 51*a* of the rotation inducing shafts 51 are connected to the connecting arms 52 at the proximal end 52*a* thereof, to pivot the connecting arms 52 when the rotation inducing shafts 51 are rotated. The connecting arms 52 are each connected to the corresponding one of the first guide and drive elements 10, 12 such that the first guide and drive elements 10, 12 pivot along with the connecting arms 52.

The rotation inducing shafts 51 are connected to a rotation inducing actuator 53 at the upper end 51*b* thereof. The rotation inducing actuator 53 is mounted on the upper section 45 of the frame 8 and operates to displace the upper end 51*b* of the corresponding rotation inducing shaft 51, which results in the rotation inducing shaft 51 rotating to pivot the corresponding one of the first guide and drive elements 10, 12. In the embodiment shown, the rotation inducing actuator 53 is a bellows actuator. In the embodiment shown, the bellows actuator includes two bellows actuators operating in opposite direction, to drive the upper end 51*b* of the corresponding rotation inducing shaft 51. However, one skilled in the art will understand that, in an alternative embodiment (not shown), a single bellows actuator or other actuator types, such as, without being limitative, a linear actuator (e.g. an hydraulic cylinders with Temposonic® position sensor, an hydraulic cylinder with Linear Variable Differential Transformer and proportional valve, an electric cylinder with a servo motor, or the like) can be used.

The second guide and drive mechanism 15 is operative to guide the plank towards the cutting assembly 22 following the natural curvature of the plank, control the processing of the plank by the cutting assembly 22 that follows the curve of the plank, and perform centering for cutting in the cutting assembly, taking into account the curve of the plank across a second zone, using the auto-centering lateral displacement mechanism 55 described above. The second guide and drive mechanism 15 also drives the planks into the cutting assembly 22, maintains the plank 13 as it is driven through the cutting assembly 22 and reduces the effect of the surface imperfections, such as knots, on the sides of the planks.

The length of the contact surface of the second guide mechanism 15 that is in contact with the planks allows the control of the radius of curvature of the sawn timber produced by the curve cutting, as a function of the natural curve of the plank, thereby eliminating the negative effects of plank surface imperfections when positioning and stabilizing the planks in the cutting assembly 22.

One skilled in the art will understand that the combination of the first guide and drive elements pivoting assembly 50 pivoting the first guide and drive elements 10, 12 of the first guide and drive mechanism 11 relative to the transfer path and the actuated sets of jointed arms 56 can operate pressure inducers for exerting a pressure on the first and second guide and drive elements 10, 12, 14 and 16, on each side of the plank. One skilled in the art will understand that, in an alternative embodiment (not shown), additional or different pressure inducers such as, pneumatic actuators, air springs, air bags, bellows or the like, can also be used.

In an embodiment, the apparatus 9 also includes sensors (not shown) operative to detect different positions of the planks in the apparatus 9, and activation means for activating the first and second guide and drive mechanisms 11, 15 according to the position of the plank in the apparatus 9. For example and without being limitative, the detectors can include photocells for detecting a displacement of the plank when the plank is received by the first guide and drive mechanism 11.

In an embodiment, each of the guide and drive elements 10, 12, 14 and 16 of each one of the first and second guide and drive mechanisms 11, 15 includes endless chains 48 having a spiked or toothed exterior surface, and toothed wheels (not shown) to drive the chains 48. One skilled in the art will understand that, in an alternative embodiment, each one of the first and second guide and drive mechanisms 11, 15 can include different components than the above mentioned toothed chains. For example and without being limitative, in an embodiment each one of the first and second guide and drive mechanisms 11, 15 can include an endless belt having an exterior surface covered with a spiked chain mat, or the like.

In an embodiment, the chains 48 of the guide and drive elements 10 and 14 of the first and second guide and drive mechanisms 11, 15 located on one side of the transfer path 20, together define a single set of chains 48 while the chains 48 of the guide and drive elements 12 and 16 of the first and second guide and drive mechanisms 11, 15 located on the other side of the transfer path 20, also together define a single set of chains 48. In an embodiment, the guide and drive elements 10 and 14 of the guide and drive mechanisms 11, 15 located on one side of the transfer path 20, have common toothed wheels 65 driving the chains 48.

In an embodiment, the endless chains 48 are each driven by an electric motor 49 mounted to the upper section 45 of the frame 8. In the embodiment shown, the electric motor 49 is operatively connected to the toothed wheel 65 driving the corresponding endless chains 48 using a vertically extending driving shaft 51 extending between the motor 49 and the corresponding chains 48. One skilled in the art will understand that, in an alternative embodiment, the endless chains 48 could be driven by a motor different than an electric motor 49, such as, for example and without being limitative an hydraulic motor or the like. Moreover, in another alternative embodiment, the motor 49 could be positioned differently than on the upper section 45 of the frame 8.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. An apparatus for guiding a plank along a transfer path having a central axis and towards a cutting assembly, the apparatus comprising:

a frame having a platform with a support surface for supporting the plank and an upper section at an upper end of the frame, the platform comprising two support plates displaceable transversally with respect to the transfer path and equidistant relative to the central axis;

at least one support plate actuator operatively connected to a corresponding one of the support plates, the support plate actuator displacing the corresponding one of the support plates transversally with respect to the transfer path;

a lateral guiding system including guide and drive elements positioned on each side of the transfer path for receiving, guiding and driving the plank along the transfer path, the guide and drive elements being movable transversally with respect to the transfer path and being equidistant relative to the central axis, with the guide and drive elements positioned on a same side of the transfer path, each being operatively connected to a corresponding one of the support plate; and an auto-centering lateral displacement mechanism maintaining the support plates and the corresponding guide and drive elements equidistant relative to the transfer path, the auto-centering lateral displacement mechanism including a support plate connecting assembly comprising:

at least one pair of fixed length vertically extending driving shafts having one driving shaft connected to each one of the support plates, the driving shafts each having a lower end connected to the corresponding support plate and an upper end and being angularly movable relative to a vertical axis according to the lateral position of the corresponding support plate;

at least one bushing assembly mounted to the upper section of the frame, each bushing assembly receiving therein the upper end of a corresponding one of the driving shafts of the at least one pair of driving shafts; and a fixed length connecting shaft extending between the driving shafts of the at least one pair of driving shafts, at the upper end thereof.

2. The apparatus of claim 1, wherein the at least one pair of fixed length vertically extending driving shafts includes at least two pairs of fixed length vertically extending driving shafts.

3. The apparatus of claim 2, wherein the auto-centering lateral displacement mechanism further comprises two sets of jointed arms, each set of jointed arms being located on one side of the transfer path and each arm of each set of jointed arms having a distal end pivotally mounted to a corresponding one of the support plates and a proximal end pivotally mounted to the corresponding guide and drive elements, the arms of each set of jointed arms moving substantially parallel to one another and the pivotal movement of the two sets of jointed arms being synchronized by the support plate connecting assembly.

4. The apparatus of claim 3, wherein each one of the driving shafts of the support plate connecting assembly is rotatable and is connected to one of the jointed arms of the two sets of jointed arms, at the distal end thereof, and rotating therewith, the support plate connecting assembly further comprising extension members connected at the upper ends of each one of the driving shafts, the extension members having a proximal end and a distal end spaced apart from a rotating center of the corresponding driving shaft, the connecting shafts being mounted to the distal ends of the extension members of the corresponding driving shafts.

5. The apparatus of claim 4, wherein the distal end of each one of the jointed arms of the two sets of jointed arms is mounted to a rotating anchor rotatingly connected to the corresponding support plate, each one of the driving shafts of the support plate connecting assembly being connected to a corresponding rotating anchor.

6. The apparatus of claim 3, further comprising at least one lateral guiding system actuator operatively connected between a corresponding one of the support plates and the corresponding guide and drive elements for laterally moving the corresponding guide and drive elements relative to the transfer path.

7. The apparatus of claim 6, wherein each arm of the two sets of jointed arms comprises an actuation extension extending from the distal end thereof and the at least one of the lateral guiding system actuators includes an actuator actuating the actuation extension of the arm of the two sets of jointed arms.

8. The apparatus of claim 7, wherein the lateral guiding system actuator is a bellows actuator.

9. The apparatus of claim 3, wherein the lateral guiding system includes a first guide and drive mechanism and a second guide and drive mechanism, the first guide and drive mechanism including two first guide and drive elements arranged opposite relative to the transfer path and the second guide and drive mechanism includes two second guide and drive elements arranged opposite relative to the transfer path and being substantially parallel to the transfer path, the guide and drive elements of the first guide and drive mechanism and the second guide and drive mechanism positioned on a same side of the transfer path being connected through a pivoting axis.

10. The apparatus of claim 9, wherein the proximal end of each arm of each set of jointed arms is pivotally mounted to the corresponding second guide and drive elements of the second guide and drive mechanism.

11. The apparatus of claim 9, wherein the two first guide and drive elements are pivotable relative to the transfer path, the apparatus further comprising a first guide and drive elements pivoting assembly comprising vertically extending rotation inducing shafts, each having a lower end connected to a corresponding one of the first guide and drive elements and an upper end, the rotation inducing shaft being rotatable to pivot the corresponding first guide and drive element.

12. The apparatus of claim 11, wherein the first guide and drive elements pivoting assembly further comprises connecting arms, each one of the connecting arms having a proximal end connected to the lower end of a corresponding one of the rotation inducing shafts and a distal end mounted to the corresponding one of the first guide and drive elements.

13. The apparatus of claim 12, wherein each rotation inducing shaft is connected to a rotation inducing actuator at an upper end thereof, the rotation inducing actuator being mounted on the upper section of the frame.

14. The apparatus of claim 13, wherein the rotation inducing actuator is a bellows actuator longitudinally displacing the upper end of the rotation inducing shaft.

15. The apparatus of claim 9, wherein each of the guide and drive elements of the first and second guide and drive mechanisms include endless chains having a toothed exterior surface, and toothed wheels for driving the chains.

16. The apparatus of claim 15, further comprising a vertically extending driving shaft operatively connected between one of the toothed wheels and a motor mounted to the upper section of the frame.

* * * * *